United States Patent [19]

Zeranick, Jr. et al.

[11] 4,078,470
[45] Mar. 14, 1978

[54] SPLIT NUT

[76] Inventors: Paul S. Zeranick, Jr., 2645 Lenz Ave.; Paul A. Hettish, 2639 Lenz Ave., both of Ambridge, Pa. 15003

[21] Appl. No.: 654,229

[22] Filed: Feb. 2, 1976

[51] Int. Cl.² .................. F16B 37/10; F16B 39/36
[52] U.S. Cl. ...................................... 85/33; 151/19 R
[58] Field of Search ..................... 85/33; 151/19 R

[56] References Cited

U.S. PATENT DOCUMENTS

| 370,168 | 9/1887 | Truxal | 85/33 |
|---|---|---|---|
| 815,982 | 3/1906 | Schubert et al. | 85/33 |
| 1,021,110 | 3/1912 | Niewohner | 85/33 |
| 1,705,811 | 3/1929 | Eidel | 85/33 |
| 2,257,327 | 9/1941 | Bradford | 85/33 |
| 2,676,509 | 4/1954 | Graham | 85/33 |
| 3,038,366 | 6/1962 | Hindman | 85/33 |
| 3,040,400 | 6/1962 | Coady | 85/33 |
| 3,675,530 | 7/1972 | Victor | 85/33 |
| 3,797,336 | 3/1974 | Howe | 85/33 X |
| 3,799,026 | 3/1974 | Selch | 85/33 |

FOREIGN PATENT DOCUMENTS

| 255,354 | 4/1960 | Australia | 85/33 |
|---|---|---|---|
| 1,144,542 | 2/1963 | Germany | 85/33 |
| 1,119,061 | 12/1961 | Germany | 85/33 |
| 286,570 | 6/1931 | Italy | 85/33 |
| 16,880 of | 1914 | United Kingdom | 85/32 V |

Primary Examiner—Roy D. Frazier
Assistant Examiner—Thomas J. Holko
Attorney, Agent, or Firm—William J. Ruano

[57] ABSTRACT

A split nut to enable complete separation of the longitudinal halves from a threaded shank so that they may be re-fitted to any other portion thereof, particularly long threaded shanks, without the necessity of turning the nut in threaded relationship to such selected position. It is particularly useful in the case of rusted threaded shanks involving great difficulty in screw-threading the nut on the rusted threads. A special feature of the present construction of the nut halves is that it enables the making of identical and interchangeable halves, which greatly reduces manufacturing and inventory costs.

7 Claims, 11 Drawing Figures

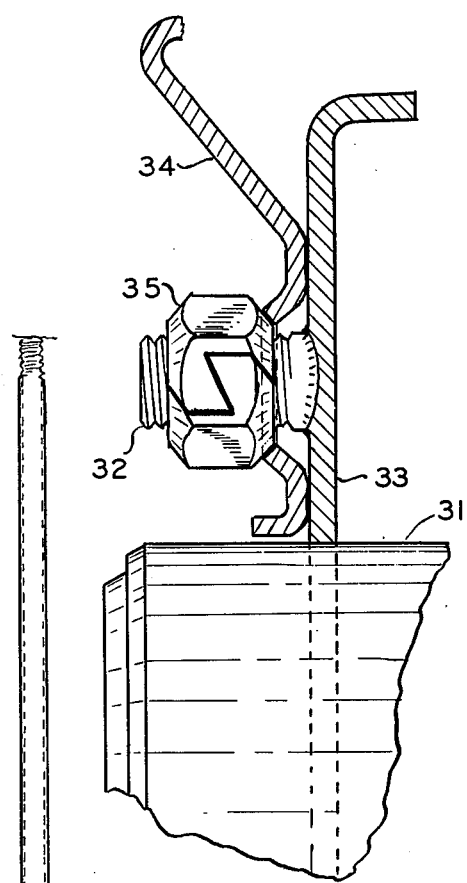
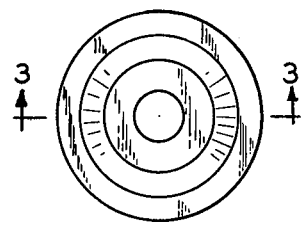
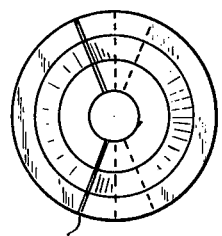
FIG. 3-A    FIG. 4-A
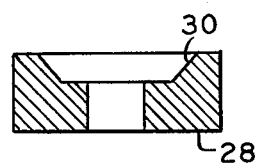
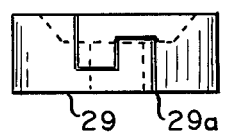
FIG. 3    FIG. 4
FIG. 5
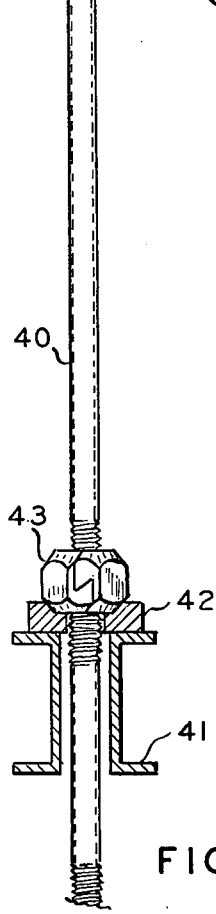
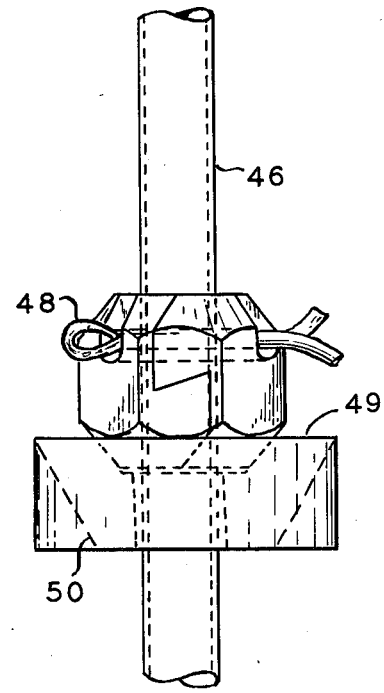
FIG. 6    FIG. 7

SPLIT NUT

This invention relates to a split nut for use on threads, particularly rusted threaded shanks, to eliminate the necessity of screw-threading the halves from one position to another longitudinal position of the threaded shank.

An outstanding disadvantage of nuts that have been used in the past on rusted threaded studs is that no practical and inexpensive construction has been provided to enable easy change of position of the nut along a rusted threaded shank without the necessity of screwing the nut thereon which is sometimes very difficult or impossible, depending upon the extent of rust.

An object of the present invention is to provide a novel split nut construction which overcomes the abovenamed disadvantages of presently used nuts and which enables easy and speedy repositioning of the nut longitudinally of a threaded stud or shank without the necessity of screwing the nut thereon.

Another object of the present invention is to provide a split nut of relatively simple construction, yet one that can be securely locked at any position along a threaded shank.

Still another object of the present invention is to provide a split nut having halves which are of identical construction, allowing use of a single mold for making the identical halves.

Other objects and advantages will become more apparent from a study of the following description taken with the accompanying drawings wherein:

FIG. 1A is a top view thereof;

FIG. 2A shows a top view thereof;

FIG. 3 shows a cross-sectional view taken along line 3—3 of FIG. 3A showing a unitary locking ring, illustrated in dotted outline in FIG. 1; and FIG. 4 shows a modification of the locking ring shown in FIGS. 3 and 3A, illustrating a split locking ring and FIG. 4A is a top view thereof;

FIG. 5 is a fragmentary elevational view, partly in cross-section, of an automobile wheel rim, showing a split nut, such as that illustrated in FIG. 1 or 2;

FIG. 6 is an elevational view, partly in cross-section, showing an application of the invention to a field construction unit embodying a long threaded rod or shank with a split nut and locking ring of the present invention; and, FIG. 7 shows a split nut with a cotter pin for more securely locking the nut halves together.

Figure 2:
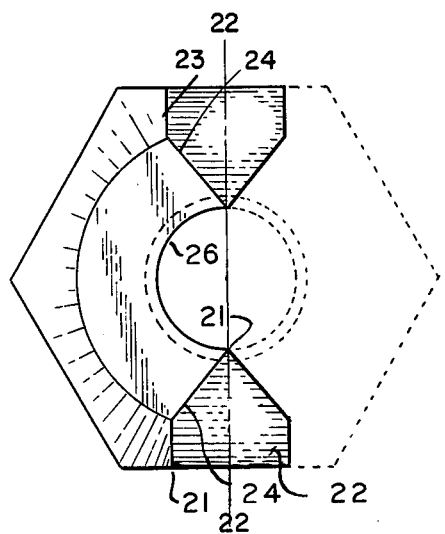
FIG. 2 shows a modification of the nut shown in FIG. 1.
Figure 2:
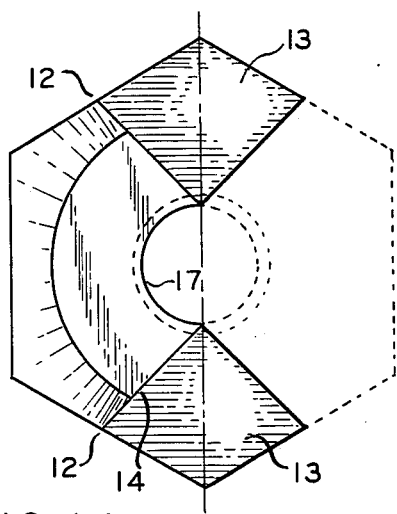
Figure 2:
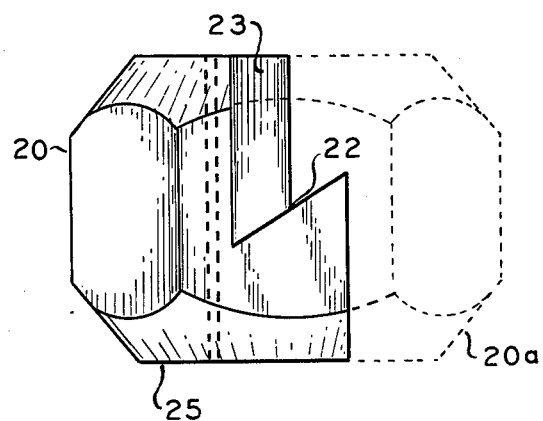
Figure 1:
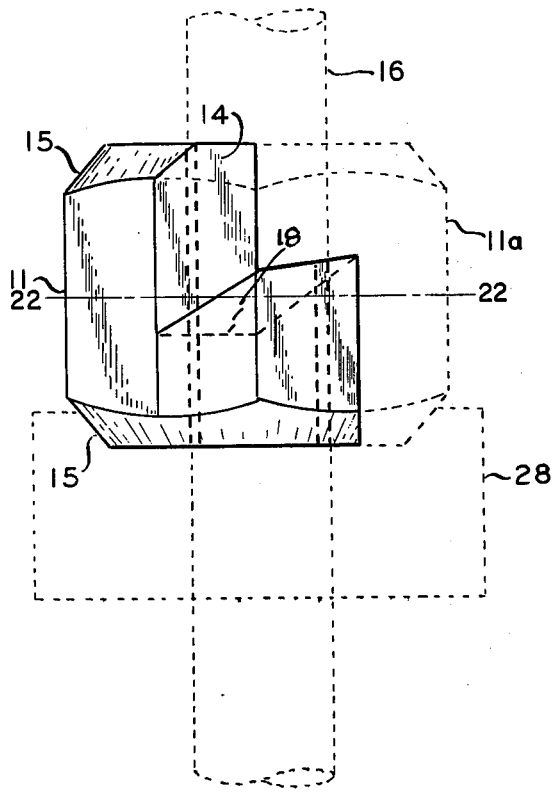
FIG. 1 shows a side, elevational view of one half of a split nut embodying the present invention, the other half being shown in the dotted outline.

Referring more particularly to FIGS. 1 and 2 of the drawing, numeral 11 denotes a longitudinally split nut half embodying the present invention and numeral 11a shows, in dotted outline, the complementary half or mating half to form a complete nut. The nut, while shown as a hexagonal nut, may, instead, have eight or four sides.

The nut is split along parting vertical planes 14, extending between edge lines 12, 12 at the top and terminating along line 18 at the bottom. Another parting plane 13 extends from line 18 at any suitable angle for example, an angle of 30° relative to the horizontal plane although the angle may be 45° or over. The nut is screw threaded at 17. Preferably, the tops and bottoms of the nut halves 11 and 11a are chamfered at surfaces 15, 15. By locating line 22 centrally of the height of the entire nut, it is possible, with the parting surfaces just described, to make the half 11a of identical construction to 11. In other words, half 11a, is identical to half 11 but is inverted.

The nut halves will stay assembled and resist lateral separation by virtue of the interlock provided by the inclined surfaces 13, 13. However, to securely lock the nut halves together, a locking ring 28 is provided of the construction such as shown in FIGS. 3 and 3A embodying a well portion 30 in the form of a truncated cone which seats the lower chamfered surface 15 of the nut. In some instances, it is desirable to split the locking ring such as in the manner shown in FIG. 4A, embodying ring halves 29 having parting surfaces at 29a.

FIGS. 2 and 2A show a modification of the split nut, embodying nut halves 20 and 20a, the latter being shown in dotted outline. The nut half 20 has a vertical parting plane 23 disposed at an obtuse angle to vertical plane 24 at mid-height of the nut, the nut halves 20 and 20a will be exactly identical and interchangeable, requiring a single mold to make both nut halves.

It should be noted, however, that while it is greatly advantageous to provide interchangeable nut halves so that the nut can be made very cheaply, the present invention may include nut halves which are not identical, such as for example, those made as shown in FIGS. 1 or 2 wherein the intersecting vertical and inclined planes are not at the mid-point of the height of the nut, or perhaps where other than a single flat surface is provided in the vertical plane. The chamfers 15 may be omitted from the top and bottom of the nut.

FIG. 5 shows the slit nut illustrated in either FIG. 1 or FIG. 2 applied to the tire supporting rim of an automobile wheel, however eliminating the need for a locking ring. The wheel axle 31 has a hub 33 and wheel rim 34 shown in fragmentary form, having an integral threaded stud 32 onto which is screwed the split nut 35 of the construction such as described in FIG. 1 or FIG. 2 exclusive of the locking ring. A plurality of studs 32 and split nuts 35 are provided along a circular path for holding the rim 34 against hub 33. The nuts are removed when changing tires in a well known manner. The wheel rim 34 is provided with a hole having a frustoconical seat which closely fits the chamfer 35 of the nut, thus preventing separation of the nut halves. Therefore, if the threads of bolts 32 become so rusty as not to be capable of unscrewing from the stud, the nut halves may be pulled apart laterally after clearing the hole of the rim 34.

It will be noted in FIGS. 1A and 2A that the vertical planes provide a top surface whose edges are about 90° apart.

FIG. 6 shows a unit 4a in a large form for pouring concrete embodying very long screw threaded rods 40. Instead of using the ordinary nut, which would require considerable time and effort to unscrew in either direction, there is provided a split nut 43, according to the present invention, seated in a locking ring 42 of the construction shown in either FIG. 3 or FIG. 4, which ring is securely fastened to a pair of channels 41 which may be supported on or attached to steel frame structures. It will be noted that as soon as nut 43 is unscrewed from seating engagement with ring 42, it may be readily pulled apart laterally and reclamped or reassembled on any other longitudinal portion of the screw threaded rod 40.

It should be noted that FIGS. 5 and 6 are merely examples of numerous applications wherein it is desired to unscrew the nut from the threaded shank without the necessity of unscrewing it along the entire length of the threaded shank.

FIG. 7 shows a modification involving a long threaded stud 46 provided with a split nut, as shown in FIG. 1 or FIG. 2, wherein the nut halves are securely locked together by a cotter pin 48 and wherein, if desired, a locking ring 50 may be used with a locking ring shown in FIG. 3, or one with a modified taper 50.

Thus it will be seen that we have provided a nut which is split longitudinally in a very unique manner so as to interlock and resist lateral separation, as well as to make it possible to assemble the nut by using identical nut halves and thereby cut the cost in half of providing molds for the shaping thereof; also we have provided a split nut made of parts of simple and easy to make construction, involving very low cost of manufacture because of the simplicity of the parts, yet which are securely locked together on a threaded stud or shank.

While we have illustrated and described several embodiments of our invention, it will be understood that these are by way of illustration only and that various changes and modifications may be contemplated in our invention and within the scope of the following claims.

We claim:

1. An internally threaded nut split longitudinally into complementary halves along vertical flat planes extending to an intermediate portion of the height of the nut, thence along flat planes extending at an acute angle to the horizontal to provide interlocking against direct horizontal separation, but being freely separable laterally along said acute angle, said vertical flat planes of one half being separated by an angle, along a horizontal plane, of about 90° and those of the other half being separated along a horizontal plane by an angle of about 270°, each of said halves being of identical and interchangeable construction so as to reduce inventory to one half.

2. A nut as recited in claim 1 together with a locking ring into which one end of the nut is snugly seated to prevent lateral separation of said halves.

3. A nut as recited in claim 2 wherein said locking ring is split into interlocking parts.

4. A nut as recited in claim 2 which is chamfered on the top and bottom.

5. A nut as recited in claim 4 together with a locking ring having a correspondingly shaped well portion for seating one end of said nut.

6. A nut assembly as recited in claim 5 together with a cotter pin extending through a lateral hole offset from the diameter of the split nut.

7. A plurality of nuts of the construction recited in claim 4 in combination with threaded studs which emerge from the hub of an automotive vehicle along a circular path, and a rim of the automotive vehicle wheel including a plurality of correspondingly arranged holes through which said studs extend, the peripheres of said holes being chamfered to snugly fit one of the chamfered ends of said nuts.

* * * * *